3,157,525
COATING COMPOSITIONS
Robert Arnold Braun, Newark, Del., assignor to E. I. du Pont de Nemours and Company, Wilmington, Del., a corporation of Delaware
No Drawing. Original application Nov. 15, 1961, Ser. No. 152,639, now Patent No. 3,090,790, dated May 21, 1963. Divided and this application Aug. 8, 1962, Ser. No. 215,506
1 Claim. (Cl. 106—287)

This invention relates to a new chemical compound 2,4,5,7,8-pentavinyl-1,3,6-trioxacyclooctane which has the structural formula

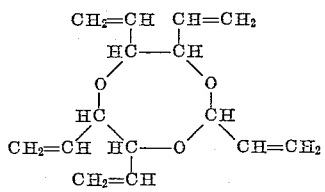

The new compound can be prepared by the cyclic condensation of divinyl glycol, i.e. divinyl ethylene glycol

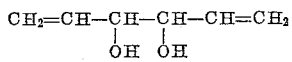

The reaction is preferably carried out in the presence of a suitable catalyst, at a moderately elevated temperature, in the substantial absence of oxygen and in the presence of a vinyl polymerization inhibitor.

Examples of suitable catalysts are the cupric salts of common acids, for example cupric chloride, bromide, sulfate, nitrate and acetate. These can also be used in their hydrated forms and in the form of mixtures or solutions. A preferred catalyst is cupric chloride. The preferred proportions are in the general range of 0.1%–10% by weight based on the amount of divinyl glycol used.

For the purpose of minimizing the reaction time, a moderately elevated temperature in the range of about 50°–150° C. is preferred. Higher temperatures which are below the decomposition temperature of the components of the reaction mixture can also be used but tend to increase undesirable side reactions and to cause the desired product to polymerize.

Although absolute exclusion of oxygen from the reaction mixture is not necessary, the reaction is preferably carried out in a low oxygen environment, for example in a vented but otherwise closed vessel continuously swept with an inert gas such as nitrogen.

Since both the starting material, divinyl glycol, and the new compound are unsaturated and susceptible to polymerization, a vinyl polymerization inhibitor is preferably present during the reaction. However such an inhibitor is not necessary, particularly a low reaction temperature and rigorous exclusion of oxygen are practiced in the process. Suitable inhibitors are those well known in the vinyl polymerization art, for example phenothiazine, hydroquinone, ditertiarybutyl hydroquinone, pyrocatechol and parahydroxydiphenyl amine. The preferred proportions are in the general range of 0.1%–2% by weight based on the amount of divinyl glycol. In most uses of the new compound, the inhibitor is removed or at least reduced to an innocuous concentration.

The new compound is useful as a monomer or comonomer in the preparation of homopolymers and also copolymers with other compounds containing the $CH_2=C<$ group by conventional vinyl polymerization techniques. Because of its high degree of vinyl unsaturation or so-called polyfunctionality, it is useful as a cross-linking agent for polymers from unsaturated monomers.

The new compound is also useful, in both clear and pigmented coating compositions, as an air-drying film-forming material. Air-drying is the property of spontaneously converting upon prolonged exposure to air (oxygen) into a coating which is insoluble in or only somewhat softened by a solvent (e.g. paint thinner) in which the starting material dissolves. As an analogy, paints and varnishes comprise an air-drying film-forming substance, e.g. linseed oil or the like. Paint drier is usually incorporated in air-drying coating compositions to speed the drying process. In this invention, cobalt-based driers (e.g. cobalt naphthenate, linoleate, oleate, octoate, resinate, tallate, linoresinate, nitrate, sulfate) are preferred. Cobaltous salts of half esters of dicarboxylic acids are especially preferred driers because they are most effective in yielding fast drying. A particularly preferred drier is cobaltous butyl phthalate because of its easy solubility in the new compound. Conventional paint driers such as the soaps and salts of lead, manganese, iron or other siccative metals can also be used in proportions up to 2%–3% of metal, but preferably in addition to a cobalt drier. The preferred proportion of cobalt drier is in the general range of 0.01%–1% by weight of cobalt in the drier compound based on the weight of the new compound of this invention.

The following examples are illustrative.

*Example 1*

A mixture of 114 grams of divinyl glycol, 5 grams of cupric chloride dihydrate catalyst (3.94 grams $CuCl_2$), and 0.5 gram of phenothiazine polymerization inhibitor was charged into a three-necked flask equipped with an agitator, thermometer, nitrogen inlet and still head with condenser. Air (oxygen) was displaced by nitrogen, and a stream of nitrogen was continued throughout the reaction period. The reaction mixture was heated at approximately 100° C. for about six hours with constant moderate agitation. During this period 8.5 ml. of water and 0.7 ml. of a light yellow oil were distilled off.

The reaction mixture was cooled to approximately room temperature and was then washed with 200 ml. of water. Upon setting, the water-insoluble layer was separated and was dried over magnesium sulfate. Following filtration, the remaining liquid was fractionally distilled under vacuum in a three foot spinning band column. The fraction which distilled at 49° C. and 0.22 mm. Hg was retained and was subsequently determined by chemical and infrared analysis to be the compound of this invention, namely 2,4,5,7,8-pentavinyl - 1,3,6 - trioxacyclooctane, a colorless odorless liquid.

*Example 2*

In 10 grams of the compound of Example 1 was admixed 0.5 ml. of cobaltous butyl phthalate drier solution in toluene (10 mg. of Co per ml. of solution). A coating of the resulting liquid mixture was drawn on a clean steel panel under a doctor knife having a clearance of about 3 mils. The wet coated panel was permitted to dry by exposure to air at room temperature (about 25° C.). In about 4 hours the coating was dry, clear, hard and adherent.

A 10 mil coating similarly prepared dried in 5 to 6 hours.

In this and in other coating compositions of this invention, lower temperatures and/or lower concentrations of drier generally increase the drying time. Artificially elevated temperatures, e.g. 50°–100° C., and/or higher concentrations of drier in the range set forth hereinbefore generally decrease the drying time.

This application is a division of application Serial No. 152,639, filed November 15, 1961, and now U.S. Patent No. 3,090,790, granted May 21, 1963.

I claim:

A liquid coating composition consisting essentially of 2,4,5,7,8-pentavinyl-1,3,6-trioxacyclooctane and a cobalt drier.

No references cited.